United States Patent
Puolakka

[15] 3,660,662
[45] May 2, 1972

[54] X-RAY APPARATUS FOR MEASURING PAPER WEB MOISTURE AND THE LIKE

[72] Inventor: Heikki Puolakka, Jyvaskyla, Finland
[73] Assignee: Valmet Oy, Helsinki, Finland
[22] Filed: Apr. 1, 1969
[21] Appl. No.: 811,852

[30] Foreign Application Priority Data
Apr. 3, 1968 Finland..................................926/68

[52] U.S. Cl. ........................250/83.3 D, 250/51.5, 250/105
[51] Int. Cl............................................................G01t 1/16
[58] Field of Search ....................................250/51.5, 83.3 D

[56] References Cited

UNITED STATES PATENTS

| | | | |
|---|---|---|---|
| 3,121,166 | 2/1964 | Vossberg | 250/83.3 |
| 3,270,204 | 8/1966 | Rhodes | 250/83.3 |
| 3,443,092 | 5/1969 | Carr-Brion et al. | 250/51.5 |

Primary Examiner—James W. Lawrence
Assistant Examiner—Davis L. Willis
Attorney—Richards & Geier

[57] ABSTRACT

A pick-up is provided for a measuring device used to measure the moisture content, the filler content or the content of coating material of a paper web or the like. The measuring takes place by the X-ray fluorescence method. The pick-up has a radiation source which is ring-shaped and is located on the same side of the paper web as the detector which is located behind the radiation source. The invention is particularly characterized by the provision of a ring-shaped radiation shield placed between the radiation source and the window of the detector. The dimensions of the radiation shield are so selected that a flat-top maximum is produced in a characteristic curve indicating the dependence of the measuring signal from the distance between the radiation source and the backing material, other characteristics remaining constant.

7 Claims, 4 Drawing Figures

PATENTED MAY 2 1972

INVENTOR:
H. Puolakka
BY Richards & Geier
ATTORNEYS

X-RAY APPARATUS FOR MEASURING PAPER WEB MOISTURE AND THE LIKE

This invention relates to a pick-up for a measuring device and refers more particularly to a pick-up for a device used to measure the moisture content, the filler content or the content of a coating material of a paper web by the X-ray fluorescence method wherein the radiation source is ring-shaped.

The usual procedure is to provide a radiation source consisting of a radio-isotope selected depending upon the required measurements. This radiation source is placed so that it emits primary radiation toward a paper web. A part of the radiation passes through the paper web and strikes a backing plate located beyond it. By way of example, the wire of the paper machine may act as the backing. A part of the radiation which has passed through the paper web excites in the backing plate characteristic secondary X-ray radiation of the plate. A part of this secondary radiation is emitted in the direction toward the radiation detector located behind the source of radiation, so that some of it passes through the paper web, strikes the detector and produces a measurable signal. If the energies of the primary and secondary radiations are properly selected and if the detector is properly protected from direct radiation of the radiation source by the use of a primary shield, the measuring signal thus obtained is approximately inversely proportional to a given quality characteristic of the paper web to be measured.

It should be noted, however, that unless special precautions are taken, rules of geometry provide that the radiation quantity incident upon the detector and thus also the measuring signal are approximately inversely proportional to the second power of the distance between the radiation source and the backing plate and to the second power of the distance between the backing plate and the radiation detector.

As is well known, a small relative change in distance will thus produce a relative change in the measuring signal which is four times as large. Consequently, if it is desired that the relative measurement error should be less than $1t$, the distance between the measuring device and the backing plate must be kept constant within $0.25t$. Since the total distance of the equipment of this type is in the order of 10mm, the variation in distance permissible for a 1 percent accurate measuring instrument is only ± 0.025mm. A variation in the web distance from the device of a magnitude of only 0.5mm already produces an error of 20 percent in the measured results.

It is thus apparent that in measuring instruments suitable for practical use this dependency of the results of measurements from the distance must be eliminated in one way or another.

In prior art this elimination is known in connection with a measuring device used for a different purpose. This device includes the use of a stop aperture placed between the radiation source and the paper. By properly selecting the size of the aperture and other dimensions of the device, the common area of the object of measurement "viewed" both by the source and by the detector is limited to such an extent that the magnitude of the measuring signal attains with the changing position of the backing plate, a maximum value at a given distance. Around this maximum value the characteristic curve showing the magnitude of the measured results as a function of this distance has a flat plateau peak. By selecting the measuring distance to be used so that it coincides with the center of this plateau interval, a measuring signal is produced which has great accuracy and which is independent from the distance within a fairly wide range.

However, this arrangement has the drawback that the stop aperture screens off a part of the radiation. Thus the geometrical efficiency is poor and it is necessary to use correspondingly more powerful radiation sources.

An object of the present invention is to provide for a measuring device a pick-up which will avoid drawbacks of existing constructions.

Other objects will become apparent in the course of the following specification.

In the accomplishment of the objectives of the present invention it was found desirable to provide a ring-shaped radiation shield between the ring-shaped radiation source in the pick-up and the window of the detector. The dimensions of the ring-shaped radiation shield are so selected that the characteristic curve indicating the measuring signal as a function of the distance between the radiation source and the backing material, has a flat-top maximum, all other characteristics remaining constant. This device is used in such manner that for the mounting distance of the radiation source from the backing material a distance is chosen which corresponds to the center of the peak area of the characteristic curve. Thus in the relationship between the measuring signal and the distance from the source, a characteristic curve is obtained which is similar to that of the above-described known device, with its maximum point and flat peak portion. However, the device of the present invention has the additional advantage that good geometrical efficiency is attained, since there are no screening bodies in front of the detector window.

The invention will appear more clearly from the following detailed description when taken in connection with the accompanying drawing, showing, by way of example only, a preferred embodiment of the invention idea.

Figure 4:
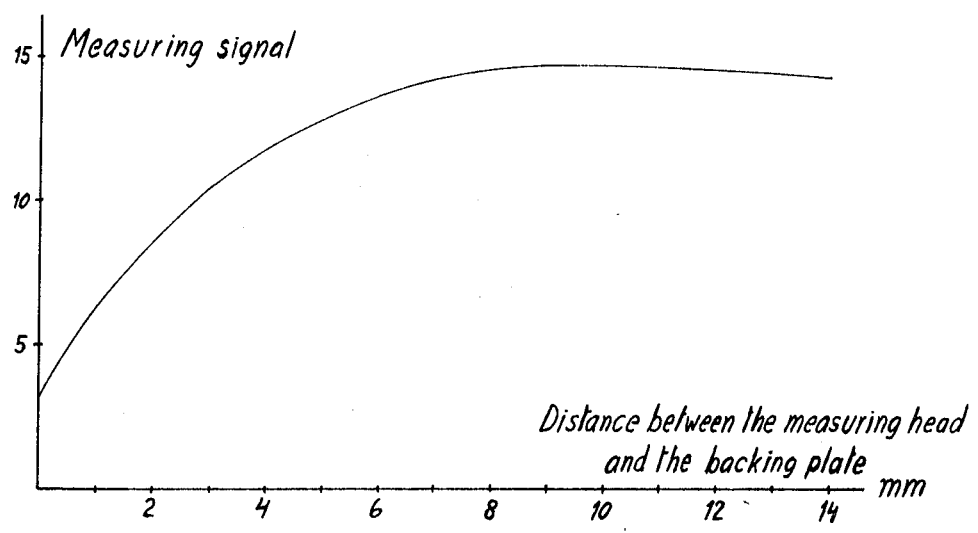

FIG. 4 displays the relationship between the measuring signal and the distance of the pick-up from the backing plate.

Figure 1:
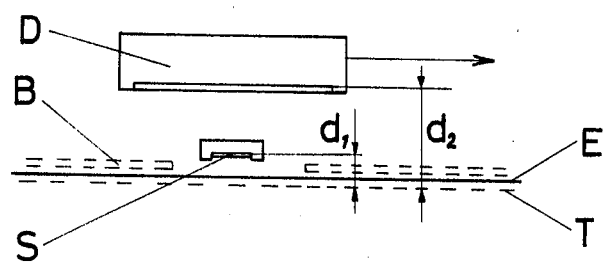
FIG. 1 illustrates diagrammatically a measuring device with a pick-up of the type known in prior art.

The prior art device shown in FIG. 1 includes a detector D serving as a radiation detector, and a source S of radiation. An aperture stop B of special design is indicated by broken lines. According to this construction the magnitude of the measuring signal is approximately proportional to $1/d_1^2 d_2^2$, where $d_1$ is the distance between the backing material T located behind the paper web E and the radiation source S, and $d_2$ is the distance between the backing material T and the radiation detector D.

Figure 3:
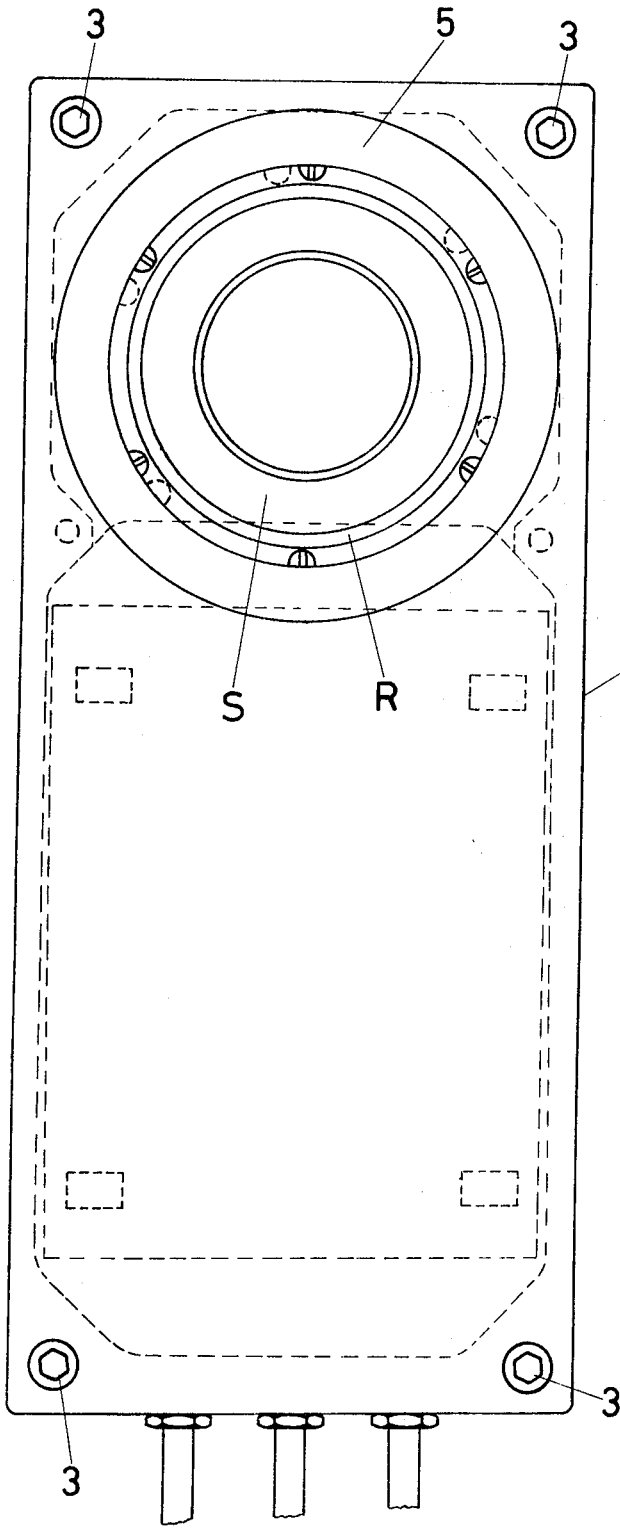
FIG. 3 is a top view of the device shown in FIG. 2.
Figure 2:
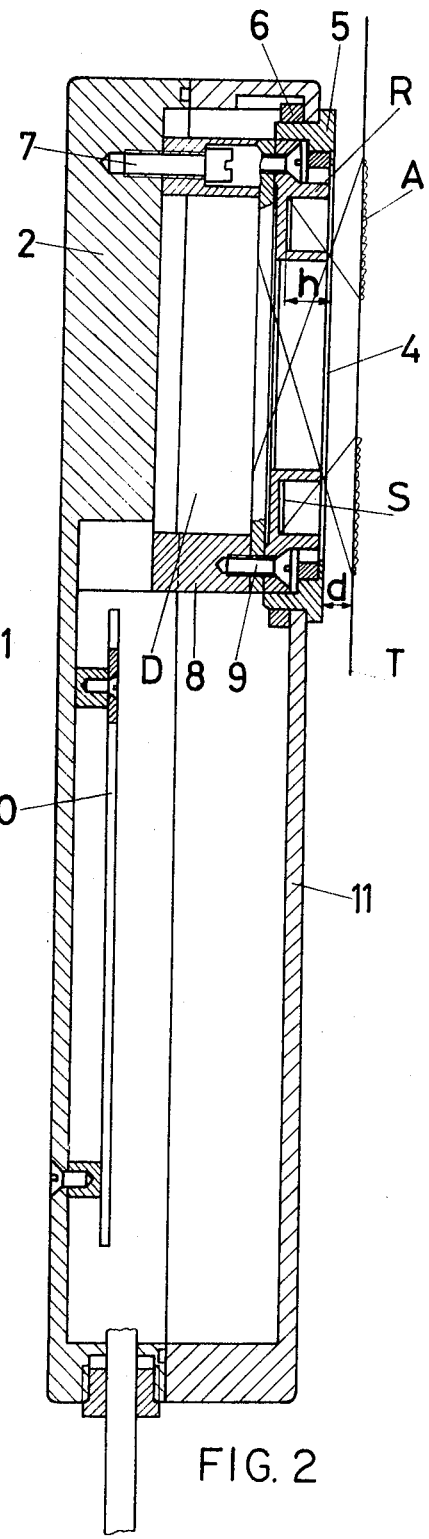
FIG. 2 is a longitudinal section of a measuring device with a pick-up constructed in accordance with the present invention.

The pick-up unit of the measuring device shown in FIGS. 2 and 3 comprises the bottom part 11 and a housing constituting the lid part 2, which has been fixed to the bottom part with screws 3. The said lid part 2 has at one nd a circular opening, into which a ring 5 provided with a window 4 of Mylar foil and supported by the lid part 2 has been placed. It has been secured in position by means of a locking ring 6 in such manner that its fixing elements do not intercept any radiation. To the bottom part of the said housing there has been fixed with screws 7 a supporting ring 8, which will be located in the housing under the ring 5 in the lid part 2 and concentrically with it. In the space formed by the said supporting ring 8 the radiation detector D has been placed, which rests on the supporting ring 8 by the flange at its upper end. On the said flange of the radiation detector rests a ring-shaped radiation shield R. In the annular depression in the latter the radiation source S has been placed. The radiation shield R has been secured to the supporting ring by screws 9. T indicates the backing plate. Located between this backing plate and the pick-up is the material subjected to measurement, its distance from the pick-up being denoted with d. The height of the annular depression in the radiation shield R has been denoted with h. The housing formed by the bottom part and lid part contains the circuit board 10, on which the requisite electronic components have been mounted.

The radiation source excites secondary radiation on a ring-shaped area of the backing plate T. The portion A of the irradiated surface of the backing plate from which secondary radiation can reach the radiation detector increases with increasing distance d between the backing plate and the pick-up. This effect compensates for the influence of the decrease, in accordance with the square of the distance, of the solid angle. At a certain value of h complete compensation is achieved so that at a given distance d the measuring signal is independent of small changes of the distance. The said radiation shield has been dimensioned to have a height h such that the characteristic curve (FIG. 4) expressing the dependence of the measuring signal on the distance between the radiation source and backing material, for constant values of all other characteristics, will have a flat-topped maximum. The intensity supplied by the radiation source will be utilized with greatest possible efficiency since the source is ring-shaped and there are no elements in front of the detector which would cause a screening effect.

I claim:

1. In a measuring device for ascertaining contents of various substances backing a moving web by the X-ray fluorescence method, a monitoring means comprising a radio-isotope constituting a primary radiation source and a detector, said primary radiation source being located between the moving web and said detector, said detector monitoring characteristic X-ray radiation produced by said primary radiation source in the web backing and producing a signal indicating the content of the substance being investigated in the web, an annular radiation shield having a bottom and two annular flanges directed toward said web, said primary radiation source being located on the bottom of said radiation shield, and an inner annular flange having a detector window located in the center of said radiation shield, the ratio of the diameter of the detector window and the height of said flange, and the distance of the monitoring means from the web, being such that the effect of changes in the distance between the monitoring means and the web upon said signal of the detector is within the limits permitted by the intensity of the primary radiation source.

2. A monitoring means in accordance with claim 1, wherein said distance provides a maximum signal from said detector at a specific primary radiation intensity.

3. A monitoring means in accordance with claim 1, wherein said ratio is 1.0–2.0.

4. A monitoring means in accordance with claim 1, used for measuring contents of various substances in a moving paper web.

5. A monitoring means in accordance with claim 1, used for measuring moisture content of a moving paper web.

6. A monitoring means in accordance with claim 1, used for measuring filler content of a moving paper web.

7. A monitoring means in accordance with claim 1, used for measuring coating material content of a moving paper web.

* * * * *